United States Patent
He et al.

(10) Patent No.: US 11,630,029 B2
(45) Date of Patent: Apr. 18, 2023

(54) SYNCHRONOUS CONTROL METHOD AND SYSTEM FOR LASER TEST OF OPTICAL ENGINE

(71) Applicants: Beijing Institute of Technology, Beijing (CN); TSINGHUA UNIVERSITY, Beijing (CN)

(72) Inventors: Xu He, Beijing (CN); Xiao Ma, Beijing (CN); Jianxin Wang, Beijing (CN); Fushui Liu, Beijing (CN)

(73) Assignees: Beijing Institute of Technology, Beijing (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/863,726

(22) Filed: Jul. 13, 2022

(65) Prior Publication Data
US 2022/0341818 A1    Oct. 27, 2022

Related U.S. Application Data

(63) Continuation of application No. PCT/CN2021/094048, filed on May 17, 2021.

(30) Foreign Application Priority Data

May 18, 2020    (CN) .......................... 202010419448.2

(51) Int. Cl.
*G01M 15/02*    (2006.01)
(52) U.S. Cl.
CPC .................................. *G01M 15/02* (2013.01)
(58) Field of Classification Search
CPC .................................................. G01M 15/02
See application file for complete search history.

(56) References Cited

U.S. PATENT DOCUMENTS 5,052,214 A * 10/1991 Dils ...................... G01L 23/221
                                                        701/111
5,099,681 A *  3/1992 Dils ...................... G01L 23/16
                                                        73/35.07
(Continued)

FOREIGN PATENT DOCUMENTS

CN       101726415 A      6/2010
CN       103541813 A      1/2014
(Continued)

OTHER PUBLICATIONS

Wu Ya; Optical Diagnostic Analysis of Pollutants in Cylinder with EGR Stratification; Chinese Master's Theses Full-tex Database, Jan. 15, 2019, p. C039-317; Jilin University, No. 2519, Jiefang Road, Changchun City, Jilin.
(Continued)

*Primary Examiner* — Eric S. McCall (57) ABSTRACT

Disclosed in embodiments of the present invention are a synchronous control method and system for a laser test of an optical engine. The operation of a laser can be driven by the synchronous control system. When a test of a data point is finished and the optical engine stops for optical window cleaning, the laser may still maintain stable operation under the driving of the synchronous control system, experiments may be directly carried out next time, and thus, laser test efficiency of the optical engine can be improved. Moreover, the synchronous control system is adopted to independently drive the laser to achieve energy stability before experiments, preventing an influence of long-term operation on the performance of the optical engine, and improving test accuracy.

10 Claims, 2 Drawing Sheets

(56) References Cited

U.S. PATENT DOCUMENTS

| | | | | |
|---|---|---|---|---|
| 5,252,828 | A | | 10/1993 | Kert et al. |
| 6,131,465 | A | * | 10/2000 | Wlodarczyk ......... G01L 9/0047 |
| | | | | 73/35.07 |
| 11,527,438 | B2 | * | 12/2022 | He ........................... G03F 1/86 |
| 2006/0037572 | A1 | * | 2/2006 | Yalin ....................... F02P 23/04 |
| | | | | 123/143 B |
| 2015/0042895 | A1 | * | 2/2015 | Jannard ................ H04N 9/3155 |
| | | | | 348/751 |
| 2015/0140577 | A1 | * | 5/2015 | Li .......................... G01N 21/645 |
| | | | | 250/226 |
| 2017/0009166 | A1 | * | 1/2017 | Roucis ...................... C10L 3/10 |
| 2018/0141210 | A1 | | 5/2018 | Kitahara |
| 2021/0260632 | A1 | * | 8/2021 | Takahashi ............ H05H 1/2418 |
| 2022/0350229 | A1 | * | 11/2022 | Hsu ....................... G03B 21/005 |

FOREIGN PATENT DOCUMENTS

| | | |
|---|---|---|
| CN | 103792090 A | 5/2014 |
| CN | 107782463 A | 3/2018 |
| CN | 108119277 A | 6/2018 |
| CN | 109900483 A | 6/2019 |
| CN | 110514447 A | 11/2019 |
| CN | 209727467 U | 12/2019 |
| CN | 111552211 A | 8/2020 |
| DE | 102004029957 A1 | 9/2005 |
| DE | 60126468 T2 | 11/2007 |
| DE | 112006001827 T5 | 5/2008 |
| DE | 102014218003 A1 | 3/2015 |
| JP | 2003255128 A | 9/2003 |
| JP | 2005121705 A | 5/2005 |

OTHER PUBLICATIONS

He Xu, Zeng Wei-Lin, Shang Yong, Li Xiang-Rong, Wang Jian-Xin, Liu Fu-Shui; Transparent Diesel Engine Design and Its Application in Visualization Research; Chinese Internal Combustion Engine Engineering, vol. 35 No. 2, Apr. 2014; School of Mechanical Engineering, Beijing Institute of Technology, Beijing 100081, China.

Jin Sen-Jia, Liu Fu-Shui, He Xu, Zeng Wei-Lin, Tian Guo-Hong, Li Xiang-Rong; Visualization on the Influence of the Post-injection Timing on Diesel Engine Combustion; Journal of Engineering Thermophysics, vol. 35 No. 10, Oct. 2014; School of Mechanical Engineering, Beijing Institute of Technology, Bejing 100081, China.

Gao Yong-Li, Liu Fu-Shui, He Xu, Zhang Xiao-Yu, Li Xiang-Rong, Shang Yong; Visualization Study of the Effects of the Blending Ratio of Gasoline and Diesel Fuel on the Combustion Characteristics; Chinese Internal Combustion Engine Engineering, vol. 37 No. 2, Apr. 2016; School of Mechanical Engineering, Beijing Institute of Technology, Bejing 100081, China.

Shang Yong, He Xu, Liu Fushui, Wang Jianxin; Research on the Application of Combustion Optical Visualization Technology in the Test of Internal Combustion Engine; Small Internal Combustion Engine and Vehicle Technique, vol. 45 No. 5, Oct. 2016; State Key Laboratory of Automotive Safety and Energy, Tsinghua University, Beijing, 100084, China.

Si Meng; Study on Gas Calibration Test Based on Laser Spontaneous Raman scattering; Chinese Master's Theses Full-text Database, Sep. 15, 2016, p. C035-160; Jilin University, No. 2519, Jiefang Road, Changchun City, Jilin.

Jiang Biao; Development of Control System of Variable Valve Mechanism and Experimental Study on Optical Engine; Chinese Master's Theses Full-text Database, Sep. 15, 2017, p. C039-38; Jilin University, No. 2519, Jiefang Road, Changchun City, Jilin.

He Lang; Visualization Research of the Mixture Distribution in the Cylinder and Combustion Characteristics under different Intake and Fuel Injection Strategies; Chinese Master's Theses Full-text Database, Feb. 15, 2018, p. C039-138 Tianjin University, Weijin Road Campus: No. 92 Weijin Road, Nankai District, Tianjin, 300072 China.

Wang Defu; Design and Simulation of HCCI Optical Engine Electronic Control System; Chinese Master's Theses Full-text Database, Oct. 15, 2014, p. C039-42; Jilin University, No. 2519, Jiefang Road, Changchun City, Jilin.

Wang Yachuan; Development of Optical Test Bench Based on GDI Engine; Chinese Master's Theses Full-text Database, Sep. 15, 2015, p. C035-103; Jilin University, No. 2519, Jiefang Road, Changchun City, Jilin.

Ma Yu-Po, Liu Fu-Shui, He Xu, Li Xiang-Rong, Rong Mei-Xia, Du Wei; Visualization of Combustion Characteristics of Intake Port Injected Ethanol Ignited by Diesel Fuel; Transactions of CSICE, vol. 32 (2014) No. 4 School of Mechanical Engineering, Beijing Institute of Technology, Beijing 100081, China.

* cited by examiner

SYNCHRONOUS CONTROL METHOD AND SYSTEM FOR LASER TEST OF OPTICAL ENGINE

CROSS-REFERENCE TO RELATED APPLICATIONS

This application is a continuation of International Patent Application No. PCT/CN2021/094048 with a filing date of May 17, 2021, which claims the benefit of priority from Chinese Patent Application No. 202010419448.2 with a filing date of May 18, 2020. The content of the aforementioned applications, including any intervening amendments thereto, is incorporated herein by reference.

TECHNICAL FIELD

The present invention relates to the technical field of laser tests, and in particular to a synchronous control method and system for a laser test of an optical engine.

BACKGROUND

In the research and development process of the optical engine, flowing, spraying, combustion and other information in the cylinder are required to improve the accuracy of the simulation model and shorten the research and development period. Specifically, a laser test may be carried out on a transparent optical engine to acquire information about the working process in the cylinder. For example, when the optical engine is operating at a high speed, a laser pulse may be injected to the cylinder at a specified crank angle phase moment to illuminate a test area so as to acquire flowing, spraying, combustion and other information at the crank angle moment.

The existing synchronous control system mainly uses the operation signal of the optical engine as a clock reference to trigger the emission of the laser pulse. For example, when the optical engine operates, the synchronous control system acquires a crank angle signal of the optical engine as the clock reference, and through calculation, outputs the pulse signal at the crank angle phase moment required to be tested to trigger the emission of the laser pulse, so that a test in the cylinder at a specified moment is achieved.

However, in practical applications, when the test of a data point is finished, the optical engine needs to stop for optical window cleaning, and the laser also stops working because an external trigger signal is lost. When the test of a next data point is proceeded, the laser needs to be restarted with the operation of the optical engine to achieve stable energy output. Particularly for a laser using temperature to perform frequency doubling crystal regulation, it requires more than 30 min to re-establish thermal balance, greatly affecting the experiment efficiency. Therefore, a synchronous control method for the laser test of the optical engine is urgently needed to improve the laser test efficiency of the optical engine.

SUMMARY

The present invention provides a synchronous control method and system for a laser test of an optical engine, to improve laser test efficiency of the optical engine. The specific technical solutions are as follows:

In a first aspect, the embodiment of the present invention provides a synchronous control method for a laser test of an optical engine. The method is applied to a synchronous control system for the laser test of the optical engine. The method includes:

when a starting instruction is received, controlling the system itself to drive a laser to operate at a preset frequency, where the preset frequency is a rated working frequency of the laser;

receiving a crank angle phase to be tested, input by a user, of the optical engine, where the crank angle phase to be tested is input by the user after the energy output of the laser is stable;

when a phase matching instruction is received, calculating phase difference between a system clock phase of the system and the crank angle phase to be tested, and judging whether the phase difference is smaller than a preset threshold, where the phase matching instruction is input after the optical engine is started and operates stably, and the optical engine is turned on after the energy output of the laser is stable;

when the phase difference is not smaller than the preset threshold, determining a phase deviation direction according to the phase difference, adjusting the system clock phase with a preset phase adjustment amplitude according to the phase deviation direction, and returning to execute the step of calculating the phase difference between the system clock phase of the system and the crank angle phase to be tested;

when the phase difference is smaller than the preset threshold, sending an experiment starting prompt signal, acquiring a clock frequency of the optical engine, and outputting a pulse signal at the crank angle phase to be tested according to the clock frequency of the optical engine to trigger the laser, where the experiment starting prompt signal marks the completion of phase matching; and when a phase decoupling instruction is received, triggering the laser at the clock frequency of the system, where the phase decoupling instruction is input after the laser test experiment corresponding to the crank angle phase to be tested is completed.

Optionally, prior to receiving the crank angle phase to be tested, input by the user, of the optical engine, the method further includes:

acquiring an output energy sequence of the laser, and determining whether each energy value in the output energy sequence is greater than a preset energy threshold and that the difference between the energy values is smaller than a preset difference within a preset duration;

correspondingly, receiving the crank angle phase to be tested, input by the user, of the optical engine includes:

when each energy value in the output energy sequence is greater than the preset energy threshold and the difference between the energy values is smaller than the preset difference within a preset duration, receiving the crank angle phase to be tested, input by the user, of the optical engine.

Optionally, the method further includes:

when a shutdown instruction input by the user is received, stopping the operation of the synchronous control system, where the shutdown instruction is input after all experiments are completed.

Optionally, the preset phase adjustment amplitude is smaller than the maximum allowable adjustment phase of the laser.

Optionally, channels of the synchronous control system respectively correspond to one or more lasers.

In a second aspect, the embodiment of the present invention provides a synchronous control system for the laser test of the optical engine. The system includes:

a system starting module, configured to, when a starting instruction is received, control the system itself to drive a laser to operate at a preset frequency, where the preset frequency is a rated working frequency of the laser;

a signal receiving module, configured to receive a crank angle phase to be tested, input by a user, of the optical engine, where the crank angle phase to be tested is input by the user after the energy output of the laser is stable;

a phase calculation module, configured to, when a phase matching instruction is received, calculate phase difference between a system clock phase of the system and the crank angle phase to be tested, and judge whether the phase difference is smaller than the preset threshold, where the phase matching instruction is input after the optical engine is started and operates stably, and the optical engine is turned on after the energy output of the laser is stable;

a phase synchronization module, configured to, when the phase calculation module determines that the phase difference is not smaller than the preset threshold, determine a phase deviation direction according to the phase difference, adjust the system clock phase with the preset phase adjustment amplitude according to the phase deviation direction, and trigger the phase calculation module to calculate the phase difference between the system clock phase of the system and the crank angle phase to be tested;

a trigger conversion module, configured to, when the phase calculation module determines that the phase difference is smaller than the preset threshold, send an experiment starting prompt signal, acquire a clock frequency of the optical engine, and output a pulse signal at the crank angle phase to be tested according to the clock frequency of the optical engine to trigger the laser, where the experiment starting prompt signal marks the completion of phase matching; and a phase decoupling module, configured to, when a phase decoupling instruction is received, trigger the laser at the system clock frequency of the system, where the phase decoupling instruction is input after the laser test experiment corresponding to the crank angle phase to be tested is completed.

Optionally, the system further includes:

an energy acquisition module, configured to acquire an output energy sequence of the laser, and determine whether each energy value in the output energy sequence is greater than a preset energy threshold and that the difference between the energy values is smaller than a preset difference within a preset duration;

correspondingly, the signal receiving module, specifically configured to, when the energy acquisition module determines that each energy value in the output energy sequence is greater than the preset energy threshold and the difference between the energy values is smaller than the preset difference within a preset duration, receive the crank angle phase to be tested, input by the user, of the optical engine.

Optionally, the system further includes:

an operation stopping module, configured to, when a shutdown instruction input by the user is received, stop the operation of the synchronous control system, where the shutdown instruction is input after all experiments are completed.

Optionally, the preset phase adjustment amplitude is smaller than the maximum allowable adjustment phase of the laser.

Optionally, channels of the synchronous control system respectively correspond to one or more lasers.

From the above, in the synchronous control method and system for the laser test of the optical engine, provided by the embodiment of the present invention, the synchronous control system for the laser test of the optical engine may be used for, when the starting instruction is received, controlling the system to drive the laser to operate at the preset frequency, where the preset frequency is the rated working frequency of the laser; receiving the crank angle phase to be tested, input by the user, of the optical engine, where the crank angle phase to be tested is input by the user after the energy output of the laser is stably output; when the phase matching instruction is received, calculating the phase difference between the system clock phase and the crank angle phase to be tested, and judging whether the phase difference is smaller than the preset threshold, where the phase matching instruction is input after the optical engine is started and operates stably, and the optical engine is turned on after the energy output of the laser is stable; when the phase difference is not smaller than the preset threshold, determining the phase deviation direction according to the phase difference, adjusting the system clock phase with the preset phase adjustment amplitude according to the phase deviation direction, and returning to execute the step of calculating the phase difference between the system clock phase and the crank angle phase to be tested; when a phase difference is smaller than the preset threshold, sending the experiment starting prompt signal, acquiring the clock frequency of the optical engine, and outputting the pulse signal at the crank angle phase to be tested according to the clock frequency of the optical engine to trigger the laser, where the experiment starting prompt signal marks the completion of phase matching; and when the phase decoupling instruction is received, triggering the laser at the clock frequency of the system, where the phase decoupling instruction is input after the laser test experiment corresponding to the crank angle phase to be tested is completed. Therefore, the operation of the laser can be driven by the synchronous control system. When the test of a data point is finished and the optical engine stops for optical window cleaning, the laser may still maintain stable operation under the driving of the synchronous control system, experiments may be directly carried out next time, and thus, the problem of effective synchronization between the laser requiring long-term operation to stabilize energy and the optical engine may be solved, and the test efficiency of the optical engine can be improved. Moreover, in the prior art, the optical engine is used to drive the laser, the long-term operation of the optical engine greatly increases the risk of mechanical failure and cause pollution of the optical window, making the laser test impossible. In the embodiment, the synchronous control system is adopted to independently drive the laser to achieve energy stability before experiments, preventing the influence of long-term operation on the performance of the optical engine, and improving the test accuracy. After the optical engine operates stably, a clock frequency of the synchronous control system is adjusted to achieve phase matching with the optical engine, and then the laser is driven on the basis of the clock frequency of the optical engine, improving the frequency consistency between the laser and the optical engine in the process of an experiment, and further improving the test accuracy. Definitely, it is unnecessary to achieve all forgoing advantages for implementation of any product or method of the present invention.

The innovations of the embodiment of the present invention include:

1. The operation of the laser is driven by the synchronous control system. When the test of a data point is finished and the optical engine stops for optical window cleaning, the laser may still maintain stable operation under the driving of the synchronous control system, experiments may be directly carried out next time, and thus, the problem of effective synchronization between the laser requiring long-term operation to stabilize energy and the optical engine may be solved, and the test efficiency of the optical engine can be improved. Moreover, in the prior art, the optical engine is used to drive the laser, the long-term operation of the optical engine greatly increases the risk of mechanical failure and cause pollution of the optical window, making the laser test impossible. In the embodiment, the synchronous control system is adopted to independently drive the laser to achieve energy stability before experiments, preventing the influence of long-term operation on the performance of the optical engine, and improving the test accuracy. After the optical engine operates stably, a clock frequency of the synchronous control system is adjusted to achieve phase matching with the optical engine, and then the laser is driven on the basis of the clock frequency of the optical engine, improving the frequency consistency between the laser and the optical engine in the process of an experiment, and further improving the test accuracy.

2. When the phase of the synchronous control system is adjusted, the preset phase adjustment amplitude used is smaller than the maximum allowable adjustment phase of the laser, so that the laser can be guaranteed to maintain stable operation during a phase adjustment, the laser failure caused by excessive phase adjustment amplitude is prevented, and the laser test efficiency can be further improved.

3. A plurality of lasers can be controlled through a plurality of channels, and laser tests may be carried out on a plurality of optical engines simultaneously, thereby improving the laser test efficiency.

BRIEF DESCRIPTION OF DRAWINGS

To more clearly illustrate the embodiments of the present invention or technical solutions in the prior art, the attached drawings required in the description of the embodiment or the prior art is briefly described below. Apparently, the attached drawings in the following description are only some embodiments of the present invention. For those of ordinary skills in the art, other attached drawings may also be obtained from these attached drawings without creative efforts.

DETAILED DESCRIPTION OF THE EMBODIMENTS

The technical solutions in the embodiments of the present invention are clearly and completely described below in combination with the attached drawings in the embodiments of the present invention. Obviously, the described embodiments are only some, but not all embodiments of the present invention. All other embodiments obtained by those of ordinary skills in the art without creative efforts on the basis of the embodiments of the present invention shall fall within the protection scope of the present invention.

It should be noted that the terms "including" and "having" and any variation thereof in the embodiments of the present invention and the attached drawings are intended to cover non-exclusive inclusion. For example, the process, method, system, product or equipment including a series of steps is not limited to the listed steps or units, but optionally further includes unlisted steps or units, or optionally further includes other steps of units inherent to the process, method, system, product or device.

In a known laser test method for an optical engine, the optical engine is usually used to trigger a laser. The method has the following problems:

1. A laser test requires a high stability of laser pulse energy and long-term warm-up time to achieve output stability. Due to a limitation of mechanical strength of an elongated piston of the optical engine, the operation time is usually short. If the optical engine serves as a trigger source to warm up the laser for a long time, long-term operation of the optical engine greatly increases a risk of mechanical failure and cause pollution of an optical window, making the laser test impossible. If the laser warm-up time is shortened and the test is carried out when laser energy is unstable, it is necessary to correct the non-uniformity of the laser pulse energy, putting forward a higher requirement on post-processing and being difficult to ensure the test accuracy.

2. When the test of a data point is finished, the optical engine needs to stop for optical window cleaning, and the laser also stops working because an external trigger signal is lost. When the test of a next data point is proceeded, the laser needs to be restarted with the operation of the optical engine to achieve stable energy output. Particularly for a laser using temperature to perform frequency doubling crystal regulation, it requires more than 30 minutes to re-establish thermal balance, greatly affecting the experiment efficiency.

Disclosed in the embodiment of the present invention are the synchronous control method and system for laser test of the optical engine. Before the optical engine is started, the synchronous control system outputs a preset frequency (such as 10 Hz and 20 Hz) signal to trigger the laser on the basis of a clock frequency of the system; after the optical engine is started, the synchronous control system adjusts the clock frequency of the system with reference to an input signal of the optical engine, and after the input signal is completely matched with a signal from the optical engine and the two signals are locked and synchronized, the system is changed to trigger the laser to work on the basis of the clock frequency of the optical engine; and after the test is finished, the trigger source cancels the synchronization with optical engine signal and uses the signal of the system to maintain the continuous operation of the laser, therefore, the laser is free from the influence of the shutdown of the optical engine, and the laser test efficiency of the laser optical can be improved. Moreover, before experiments start, the synchronous control system is adopted to independently drive the laser to achieve energy stability, which can prevent the influence of long-term operation on the performance of the optical engine, and improving the test accuracy. The embodiments of the prevent invention are described below in details.

Figure 1:
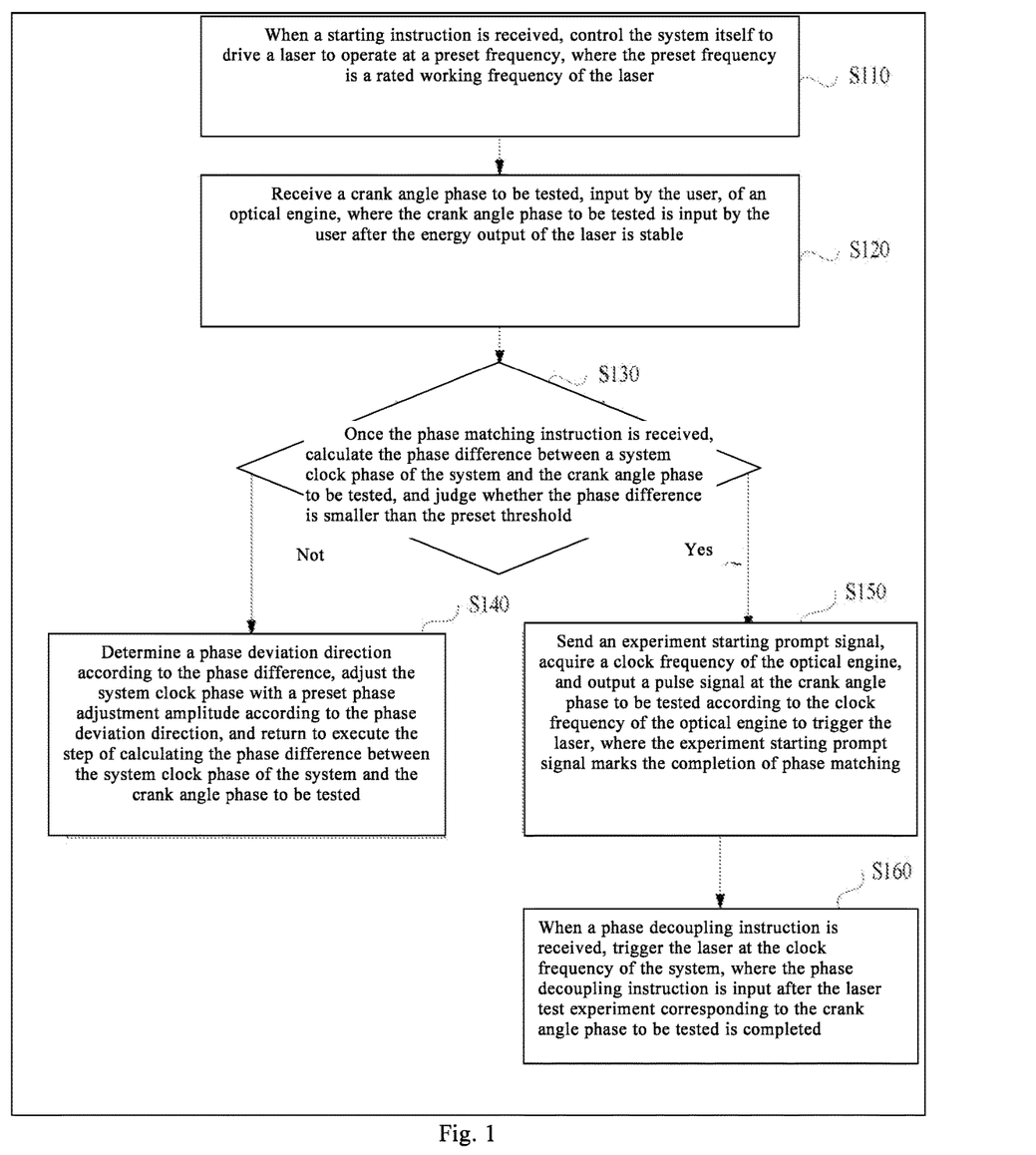
FIG. 1 is a schematic flowchart of a synchronous control method for a laser test of an optical engine of an embodiment of the present invention.

FIG. 1 is a schematic flowchart of the synchronous control method for the laser test of the optical engine provided by the embodiment of the present invention. The method is applied to the synchronous control system for the laser test of the optical engine. The method includes the following steps.

S110: when a starting instruction is received, the system is controlled to drive the laser to operate at a preset frequency, where the preset frequency is a rated working frequency of the laser.

In the embodiment of the present invention, an association relationship between the synchronous control system, the laser and the optical engine may be established, so that the laser may be triggered by the synchronous control system, and the operation parameters of the optical engine may be acquired by the synchronous control system.

Specifically, the above synchronous control system may include a synchronous controller and an operating program. After the synchronous controller is connected to an electronic device, different types of operation may be carried out on the synchronous controller by the operating program installed in the electronic device. The synchronous controller may include a plurality of interfaces, and the laser and the optical engine may be connected to the synchronous controller through the interfaces.

In the embodiment of the present invention, before laser test is carried out on the optical engine, the laser may be warmed up by the synchronous control system to achieve a stable energy output and ensure normal operation of an experiment of the laser test. The above laser may be any type of laser at any frequency, which is not limited in the embodiment of the present invention.

In an implementation mode, the synchronous control system may judge whether the laser achieves energy stability. Specifically, an energy output module may be added in the laser. The energy output module may acquire and send an output energy sequence of the laser to the synchronous control system, and after acquiring the output energy sequence of the laser, the synchronous control system may determine whether each energy value in the output energy sequence is greater than a preset energy threshold and that the difference between the energy values is smaller than a preset difference within a preset duration, if yes, it may be determined that the laser has achieved energy output stability.

S120: a crank angle phase to be tested, input by a user, of the optical engine is received, where the crank angle phase to be tested is input by the user after the energy output of the laser is stable.

After the energy output of the laser is stable, it is indicated that the laser meets a test requirement, and in this case, the user may start the optical engine and input the crank angle phase to be tested, namely the crank angle required to be tested.

S130: when a phase matching instruction is received, a phase difference between a system clock phase of the system and the crank angle phase to be tested is calculated, and whether the phase difference is smaller than a preset threshold is judged, if not, step S140 is executed, and if yes, step S150 is executed. The above phase matching instruction is input after the optical engine is started and operates stably, and the optical engine is turned on after the energy output of the laser is stable.

In practical applications, the operating frequency of the optical engine may be unstable such as jitter. In the embodiment of the present invention, to avoid an inaccurate test result caused by frequency instability of the optical engine, the laser may be driven on the basis of the clock frequency of the optical engine during test. In this way, even if the clock frequency of the optical engine changes during the test, the laser changes accordingly, which does not affect the accuracy of the test result.

Specifically, after the optical engine runs stably, the user may input the phase matching instruction, and after receiving the phase matching instruction, the synchronous control system may calculate the phase difference between the system clock phase and the crank angle phase to be tested, and judge whether the phase difference is smaller than the preset threshold, namely, judge whether the two are in phase synchronization.

S140: a phase deviation direction is determined according to the phase difference, the system clock phase is adjusted with a preset phase adjustment amplitude according to the phase deviation direction, and the step of calculating the phase difference between the system clock phase and the crank angle phase to be tested is returned to and executed.

When the phase difference is not smaller than the preset threshold, the system clock phase may be adjusted to achieve phase synchronization. Specifically, the phase deviation direction may be determined according to the phase difference, and the system clock phase is adjusted with the preset phase adjustment amplitude according to the phase deviation direction. The step of calculating the phase difference between the system clock phase and the crank angle phase to be tested is returned to and executed until phase synchronization is achieved.

In practical applications, the energy stability of the laser may be affected, even the laser may be caused to stop due to excessive phase adjustment amplitude. Therefore, in the embodiment of the present invention, the preset phase adjustment amplitude is smaller than the maximum allowable adjustment phase of the laser when the system clock phase is adjusted. In this way, it can be guaranteed that the laser can maintain stable operation during the phase adjustment, the laser failure caused by excessive phase adjustment amplitude is prevented, and the laser test efficiency can be further improved.

After the optical engine operates stably, a clock frequency of the synchronous control system is adjusted to achieve phase matching with the optical engine, and then the laser is driven on the basis of the clock frequency of the optical engine, which can improve the frequency consistency between the laser and the optical engine in the process of an experiment, and further improve the test accuracy.

S150: an experiment starting prompt signal is sent, the clock frequency of the optical engine is acquired, and the pulse signal is output at the crank angle phase to be tested according to the clock frequency of the optical engine to trigger the laser, where the experiment starting prompt signal marks the completion of phase matching.

The laser test can be carried out after phase synchronization is achieved. Specifically, the experiment starting prompt signal may be sent, the clock frequency of the optical engine is acquired, and the pulse signal is output at the crank angle phase to be tested according to the clock frequency of the optical engine to trigger the laser. After the user receives the prompt signal, the laser experiment can be carried out, and data is acquired.

S160: after a phase decoupling instruction is received, the laser is triggered at the clock frequency of the system, where the phase decoupling instruction is input after the laser test experiment corresponding to the crank angle phase to be tested is completed.

After the data is acquired, it is indicated that the laser test corresponding to the current crank angle phase to be tested is completed. In this case, the user may input the phase decoupling instruction. After receiving the phase decoupling instruction, the synchronous control system may trigger the laser at the clock frequency of the system and maintain stable operation of the laser so as to perform the test of the next data point.

At the moment, the optical engine may be stopped, overhauled, cleaned and the like, and then the test of the next data point is performed after completion. After all tests are completed, a shutdown instruction may be input, the synchronous control system is stopped, and the laser is turned off.

In an implementation mode, channels of the synchronous control system according to the embodiment of the prevent invention may respectively correspond to one or more lasers. A plurality of lasers can be controlled through a plurality of channels, and laser tests can be carried out on a plurality of optical engines simultaneously, thereby improving the laser test efficiency.

From the above, in the embodiment, the operation of the laser may be driven by the synchronous control system. When the test of a data point is finished and the optical engine stops for optical window cleaning, the laser may still maintain stable operation under the driving of the synchronous control system, experiments may be directly carried out next time, and thus, the problem of effective synchronization between the laser requiring long-term operation to stabilize energy and the optical engine may be solved, improving the test efficiency of the optical engine. Moreover, in the prior art, the optical engine is used to drive the laser, the long-term operation of the optical engine greatly increases the risk of mechanical failure and cause pollution of the optical window, making the laser test impossible. In the embodiment, the synchronous control system is adopted to independently drive the laser to achieve energy stability before experiments, which can prevent the influence of long-term operation on the performance of the optical engine, and improve the test accuracy. After the optical engine operates stably, a clock frequency of the synchronous control system is adjusted to achieve phase matching with the optical engine, and then the laser is driven on the basis of the clock frequency of the optical engine, which can improve the frequency consistency between the laser and the optical engine in the process of an experiment, and further improve the test accuracy.

Figure 2:
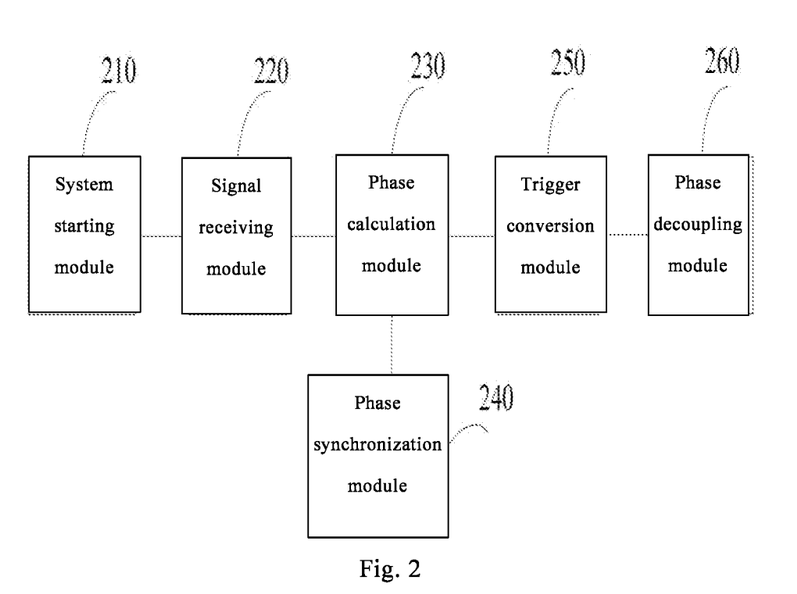
FIG. 2 is a structural schematic diagram of a synchronous control system for a laser test of an optical engine of an embodiment of the present invention.

FIG. 2 is a structural schematic diagram of a synchronous control system for the laser test of the optical engine of the embodiment of the present invention. The system includes:

a system starting module 210, configured to, when a starting instruction is received, control the system itself to drive a laser to operate at a preset frequency, where the preset frequency is a rated working frequency of the laser;

a signal receiving module 220, configured to receive a crank angle phase to be tested, input by a user, of the optical engine, where the crank angle phase to be tested is input by the user after the energy output of the laser is stable;

a phase calculation module 230, configured to, when a phase matching instruction is received, calculate phase difference between a system clock phase of the system and the crank angle phase to be tested, and judge whether the phase difference is smaller than the preset threshold, where the phase matching instruction is input after the optical engine is started and operates stably, and the optical engine is turned on after the energy output of the laser is stable;

a phase synchronization module 240, configured to, when the phase calculation module 230 determines that the phase difference is not smaller than the preset threshold, determine a phase deviation direction according to the phase difference, adjust the system clock phase with the preset phase adjustment amplitude according to the phase deviation direction, and trigger the phase calculation module 230 to calculate the phase difference between the system clock phase of the system and the crank angle phase to be tested;

a trigger conversion module 250, configured to, when the phase calculation module 230 determines that the phase difference is smaller than the preset threshold, send an experiment starting prompt signal, acquire a clock frequency of the optical engine, and output a pulse signal at the crank angle phase to be tested according to the clock frequency of the optical engine to trigger the laser, where the experiment starting prompt signal marks the completion of phase matching; and a phase decoupling module 260, configured to, when a phase decoupling instruction is received, trigger the laser at the system clock frequency of the system, where the phase decoupling instruction is input after the laser test experiment corresponding to the crank angle phase to be tested is completed.

As an implementation mode of the embodiment of the present invention, the system further includes:

an energy acquisition module, configured to acquire an output energy sequence of the laser, and determine whether each energy value in the output energy sequence is greater than a preset energy threshold and that the difference between the energy values is smaller than a preset difference within a preset duration;

correspondingly, the signal receiving module 220, specifically configured to, when the energy acquisition module determines that each energy value in the output energy sequence is greater than the preset energy threshold and the difference between the energy values is smaller than the preset difference within a preset duration, receive the crank angle phase to be tested, input by the user, of the optical engine.

As an implementation mode of the embodiment of the present invention, the system further includes:

an operation stopping module, configured to, when a shutdown instruction input by the user is received, stop the operation of the synchronous control system, where the shutdown instruction is input after all experiments are completed.

As an implementation mode of the embodiment of the present invention, the preset phase adjustment amplitude is smaller than the maximum allowable adjustment phase of the laser.

As an implementation mode of the embodiment of the present invention, the channels of the synchronous control system respectively correspond to one or more lasers.

From the above, in the embodiment, the operation of the laser may be driven by the synchronous control system. When the test of a data point is finished and the optical engine stops for optical window cleaning, the laser may still maintain stable operation under the driving of the synchronous control system, experiments may be directly carried out next time, and thus, the problem of effective synchronization between the laser requiring long-term operation to stabilize energy and the optical engine may be solved, and the test efficiency of the optical engine can be improved. Moreover, in the prior art, the optical engine is used to drive the laser, the long-term operation of the optical engine greatly increases the risk of mechanical failure and cause pollution of the optical window, making the laser test impossible. In the embodiment, the synchronous control system is adopted to independently drive the laser to achieve energy stability before experiments, preventing the influence of long-term operation on the performance of the optical engine, and improving the test accuracy. After the optical engine operates stably, a clock frequency of the synchronous control system is adjusted to achieve phase matching with the optical engine, and then the laser is driven on the basis of the clock frequency of the optical engine, improving the frequency consistency between the laser and the optical engine in the process of an experiment, and further improving the test accuracy.

The foregoing system embodiments correspond to the method embodiments, and have the same technical effects as the method embodiments. For specific descriptions, refer to the method embodiments. System embodiments are obtained on the basis of the method embodiments. Specific description may refer to the method embodiment section, which is not repeated herein.

Those of ordinary skills in the art should understand that the attached drawings are merely schematics of an embodiment, the modules or processes in the attached drawings are not necessary for implementation of the present invention.

Those of ordinary skills in the art should understand that the modules in the apparatus of the embodiment may be distributed in the apparatus of the embodiment as described in the embodiment, or may be correspondingly changed to be located in one or more apparatuses different from the embodiment. The modules in the above embodiment may be combined into one module or may be further divided into multiple sub-modules.

Finally, it should be noted that the above embodiments are merely used for illustration of the technical solutions of the present invention, but not limit them. Although the present invention has been described in detail with reference to the foregoing embodiments, those of ordinary skills in the art should understand that: the technical solutions described in the foregoing embodiments may still be modified, or equivalent substitutions to some of the technical features may be performed. However, these modifications or substitutions do not make the essence of the corresponding technical solutions deviate from the spirit and scope of the technical solutions of the embodiments of the present invention.

What is claimed is:

1. A synchronous control method for a laser test of an optical engine, the method, applied to a synchronous control system for the laser test of the optical engine, comprising:
   when a starting instruction is received, controlling the system itself to drive a laser to operate at a preset frequency, wherein the preset frequency is a rated working frequency of the laser;
   receiving a crank angle phase to be tested, input by a user, of the optical engine, wherein the crank angle phase to be tested is input by the user after the energy output of the laser is stable;
   when a phase matching instruction is received, calculating phase difference between a system clock phase of the system and the crank angle phase to be tested, and judging whether the phase difference is smaller than a preset threshold, wherein the phase matching instruction is input after the optical engine is started and operates stably, and the optical engine is turned on after the energy output of the laser is stable;
   when the phase difference is not smaller than the preset threshold, determining a phase deviation direction according to the phase difference, adjusting the system clock phase with a preset phase adjustment amplitude according to the phase deviation direction, and returning to execute the step of calculating the phase difference between the system clock phase of the system and the crank angle phase to be tested;
   when the phase difference is smaller than the preset threshold, sending an experiment starting prompt signal, acquiring a clock frequency of the optical engine, and outputting a pulse signal at the crank angle phase to be tested according to the clock frequency of the optical engine to trigger the laser, wherein the experiment starting prompt signal marks the completion of phase matching; and
   when a phase decoupling instruction is received, triggering the laser at the clock frequency of the system, wherein the phase decoupling instruction is input after the laser test experiment corresponding to the crank angle phase to be tested is completed.

2. The method according to claim 1, wherein the prior to receiving the crank angle phase to be tested, input by the user, of the optical engine, the method further comprises:
   acquiring an output energy sequence of the laser, and determining whether each energy value in the output energy sequence is greater than a preset energy threshold and that the difference between the energy values is smaller than a preset difference within a preset duration;
   correspondingly, receiving the crank angle phase to be tested, input by the user, of the optical engine comprises:
   when each energy value in the output energy sequence is greater than the preset energy threshold and the difference between the energy values is smaller than the preset difference within a preset duration, receiving the crank angle phase to be tested, input by the user, of the optical engine.

3. The method according to claim 1, wherein the method further comprises:
   when a shutdown instruction input by the user is received, stopping the operation of the synchronous control system, wherein the shutdown instruction is input after all experiments are completed.

4. The method according to claim 1, wherein the preset phase adjustment amplitude is smaller than the maximum allowable adjustment phase of the laser.

5. The method according to claim 1, wherein channels of the synchronous control system respectively correspond to one or more lasers.

6. A synchronous control system for a laser test of an optical engine, the system comprising:
   a system starting module, configured to, when a starting instruction is received, control the system itself to drive a laser to operate at a preset frequency, wherein the preset frequency is a rated working frequency of the laser;
   a signal receiving module, configured to receive a crank angle phase to be tested, input by a user, of the optical engine, wherein the crank angle phase to be tested is input by the user after the energy output of the laser is stable;
   a phase calculation module, configured to, when a phase matching instruction is received, calculate phase difference between a system clock phase of the system and the crank angle phase to be tested, and judge whether the phase difference is smaller than the preset threshold, wherein the phase matching instruction is input after the optical engine is started and operates stably, and the optical engine is turned on after the energy output of the laser is stable;
   a phase synchronization module, configured to, when the phase calculation module determines that the phase difference is not smaller than the preset threshold, determine a phase deviation direction according to the phase difference, adjust the system clock phase with the preset phase adjustment amplitude according to the phase deviation direction, and trigger the phase calculation module to calculate the phase difference between the system clock phase of the system and the crank angle phase to be tested;
   a trigger conversion module, configured to, when the phase calculation module determines that the phase difference is smaller than the preset threshold, send an experiment starting prompt signal, acquire a clock frequency of the optical engine, and output a pulse signal at the crank angle phase to be tested according to the clock frequency of the optical engine to trigger the laser, wherein the experiment starting prompt signal marks the completion of phase matching; and a phase decoupling module, configured to, when a phase decoupling instruction is received, trigger the laser at the system clock frequency of the system, wherein the phase decoupling instruction is input after the laser test experiment corresponding to the crank angle phase to be tested is completed.

7. The system according to claim 6, wherein the system further comprises:

an energy acquisition module, configured to acquire an output energy sequence of the laser, and determine whether each energy value in the output energy sequence is greater than a preset energy threshold and that the difference between the energy values is smaller than a preset difference within a preset duration;

correspondingly, the signal receiving module, specifically configured to, when the energy acquisition module determines that each energy value in the output energy sequence is greater than the preset energy threshold and the difference between the energy values is smaller than the preset difference within a preset duration, receive the crank angle phase to be tested, input by the user, of the optical engine.

8. The system according to claim 6, wherein the system further comprises:

an operation stopping module, configured to, when a shutdown instruction input by the user is received, stop the operation of the synchronous control system, wherein the shutdown instruction is input after all experiments are completed.

9. The system according to claim 6, wherein the preset phase adjustment amplitude is smaller than the maximum allowable adjustment phase of the laser.

10. The system according to claim 6, wherein channels of the synchronous control system respectively correspond to one or more lasers.

* * * * *